(12) United States Patent
Fahlbusch et al.

(10) Patent No.: US 9,001,419 B2
(45) Date of Patent: Apr. 7, 2015

(54) ATTACHMENT OF OPTICAL MICROSCOPE COMPONENTS

(75) Inventors: Ingo Fahlbusch, Göttingen (DE);
Werner Kleinschmidt, Adelebsen (DE);
Heinrich Bunger, Göttingen (DE);
Peter Schnüll, Gleichen (DE);
Wolfgang Hartje, Göttingen (DE);
Georg Herbst, Göttingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 296 days.

(21) Appl. No.: 13/577,246

(22) PCT Filed: Feb. 4, 2011

(86) PCT No.: PCT/EP2011/051689
§ 371 (c)(1),
(2), (4) Date: Oct. 15, 2012

(87) PCT Pub. No.: WO2011/095609
PCT Pub. Date: Aug. 11, 2011

(65) Prior Publication Data
US 2013/0027768 A1    Jan. 31, 2013

(30) Foreign Application Priority Data

Feb. 4, 2010 (DE) .......................... 10 2010 001 604

(51) Int. Cl.
*G02B 21/24* (2006.01)
*G02B 7/14* (2006.01)
*G02B 21/02* (2006.01)

(52) U.S. Cl.
CPC .. *G02B 7/14* (2013.01); *G02B 21/02* (2013.01)

(58) Field of Classification Search
USPC .......................... 359/368, 656, 827, 828, 830
See application file for complete search history.

(56) References Cited

U.S. PATENT DOCUMENTS

| 289,904 A | 12/1883 | Fisher |
| 2,496,928 A | 12/1947 | Bing et al. |

(Continued)

FOREIGN PATENT DOCUMENTS

| DE | 2402816 A1 | 5/1975 |
| DE | 2849932 C2 | 7/1979 |
| DE | 3202461 C1 | 6/1983 |

(Continued)

OTHER PUBLICATIONS

International Preliminary Report on Patentability for PCT/EP2011/051689, Apr. 11, 2011, 10 pages.
English translation of the International Preliminary Report on Patentability for PCT/EP2011/051689, Aug. 16, 2012, 10 pages.

*Primary Examiner* — Frank Font
(74) *Attorney, Agent, or Firm* — Skaar Ulbrich Macari, P.A.

(57) ABSTRACT

A device for attaching a first optical microscope component part to a second part includes an annular receptacle attached to the second part and an annual insertion part. The annular insertion part includes outside-conical retaining projections. The receptacle includes a base ring having a retaining collar with an inside cone tapering away from the base ring and in which a lateral opening is formed, through which the insertion part can be inserted in the receptacle such that it is located on a pre-locking position in which the annular openings overlap. The insertion part and the receptacle can be moved by reciprocal rotation from the pre-locking position into a locking position in which the outside-conical retaining projections of the insertion part are seated against the inside cone of the retaining collar and press the insertion part on the base ring, whereby the insertion part is locked to the receptacle.

14 Claims, 8 Drawing Sheets

(56) References Cited

U.S. PATENT DOCUMENTS

| | | |
|---|---|---|
| 3,202,461 A | 8/1965 | Paton |
| 3,910,686 A | 10/1975 | Nitami et al. |
| 4,515,439 A * | 5/1985 | Esswein .................. 359/381 |
| 5,053,794 A * | 10/1991 | Benz ..................... 396/432 |
| 2005/0213963 A1 | 9/2005 | Kimura |
| 2008/0013195 A1 | 1/2008 | Fahlbusch et al. |
| 2008/0186602 A1 * | 8/2008 | Teich et al. ............... 359/828 |
| 2011/0109983 A1 * | 5/2011 | Lu et al. .................. 359/827 |

FOREIGN PATENT DOCUMENTS

| | | |
|---|---|---|
| DE | 102005001102 A | 7/2006 |
| DE | 102007006066 A1 | 8/2008 |
| GB | 2011099 A | 7/1979 |

* cited by examiner

Fig. 14

ATTACHMENT OF OPTICAL MICROSCOPE COMPONENTS

PRIORITY

This application claims the benefit of International Application PCT/EP2011/051689 filed on Feb. 4, 2011, and German Patent Application No. 102010001604.7, filed on Feb. 4, 2010, both of which are hereby incorporated herein by reference in their entirety.

Field

The invention relates to a device for attaching a first part, preferably an optical microscope component, to a second part, preferably a microscope stand.

BACKGROUND

With microscopes, it is known to fix components, such as objectives, condensers, lens tubes, lamp housing, etc., in the form of modules to the microscope stand or to other microscope constituents, such as for example an objective nosepiece. The precise orientation of these components on the stand or objective nosepiece is of great importance. Bayonet locks for microscope objectives are known from U.S. Pat. Nos. 289,904, 2,496,928 or DE 2849932 C2. The bayonet lock is assembled by introducing an insertion part axially into a flange ring of the bayonet and then locking it there by rotation. U.S. Pat. No. 3,202,461 C1 also describes a bayonet lock for a microscope objective which additionally has a centring cone for centring the objective of the insertion ring in the flange ring. The bayonet lock described in this published document is only complete when a screw insert with three radially projecting spring lugs is installed.

The named bayonet locks all have the disadvantage that the rotation position of the part to be attached is determined only with an accuracy of approximately 10°. The same is true for conventional screw joints with which a component is screwed in. Screw joints also have the disadvantage that the respective component must be rotated 360° several times over. Thus, with asymmetrically constructed components, such as are present in the case of microscope objectives with laterally arranged drive motors, the maximum radius of the asymmetrical part defines the diameter that is available for screwing in.

A highly precise definition of the angular position of an optical component is, however, extremely desirable in particular in microscopy. Firstly, a simple contacting mechanism for conducting electrical signals is only possible in this way. Secondly, there is a plurality of optical applications in which a particular angular position (also called rotation position) of the component is required. The positions of phase shutters, polarizers or coupled-in illumination beam paths offset vis-à-vis the optical axis may be mentioned purely by way of example.

SUMMARY

It is, therefore, an object of the invention to provide a device of the type named at the beginning such that a simple and, in particular in respect of the attachment movement, an attachment is possible which requires less space for mounting and which preferably allows additionally a predetermined angular mounting with a high degree of precision.

This object is achieved according to the invention with a device for attaching a first part, preferably an optical microscope component, to a second part, preferably a microscope stand or a further microscope component, with the option of transmitting data and/or the electricity power, wherein the device comprises an annular receptacle attached to the second part and a likewise annular insertion part, which is attached or can be attached to the first part, and the annular insertion part has externally conical retaining projections which comprise retaining surfaces which are formed on a side of the insertion part facing away from the receptacle, the receptacle has a base ring with a retaining collar which has an inner slanting face tapering away from the base ring and in which a lateral opening is formed, through which the insertion part can be inserted into the receptacle such that it is in a pre-locked position in which the annular openings overlap, the insertion part and the receptacle can be moved by reciprocal rotation from the pre-locked position into a locked position in which the retaining surfaces of the retaining projections of the insertion part are seated against the inner slanting face of the retaining collar which is preferably formed as an internal cone and press the insertion part onto the base ring, whereby the insertion part is locked to the receptacle.

The device according to the invention combines the annular insertion part with the annular receptacle such that the insertion part can be introduced laterally into the receptacle. The insertion part is rotated only after this introduction, when the insertion part is seated with its outside edge against the inside edge of the retaining collar. This rotation transfers the device from the pre-locked position into the locked position. In the pre-locked position, only some of the slanting faces of the retaining projections of the insertion part are seated against the inner slanting face, tapering upwards, i.e. away from the base ring, of the retaining collar. When rotated into the locked position, all retaining surfaces of the retaining projections are then engaged with the inner slanting face, tapering upwards, of the retaining collar. Both slanting faces can be conically shaped. For a good fit, it is then expedient that the cone angles of the then externally conical slanting faces of the retaining projections are matched to the cone angles of the internal cone of the retaining collar. Alternatively, non-conical slants are also possible.

The structures that lie opposite each other press the insertion part onto the base ring. A well-defined planar arrangement of the insertion part on the base ring of the receptacle is thus achieved, which ensures a high degree of precision of the attachment.

A particularly precise alignment can be achieved when either the upper side of the insertion part facing the base ring or the lower side of the base ring facing the insertion part has planar elements which bring about a three-point bearing of the upper side of the insertion part on the lower side of the base ring. Such a three-point bearing avoids any interfering tilting effects.

In order that the bearing of the upper side of the insertion ring on the lower side of the base ring of the receptacle is achieved particularly precisely and in particular play-free, it is preferable to provide on the retaining collar of the receptacle a spring-loaded section which presses the insertion part onto the base ring. This spring-loaded section can be achieved in particular by a sector of the retaining collar which is pressed elastically inwards and thus presses the retaining surfaces of the retaining projections of the insertion part against the inner slanting face of the retaining collar. Through the slanting faces e.g. of external cone and internal cone, the insertion ring is automatically loaded downwards, i.e. onto the base ring.

To define the rotation position, it is expedient to provide a stop which limits the rotation from the pre-locked position into the locked position. This stop can be formed for example as a peg or pin which projects out of the lateral opening of the retaining collar and thereby limits the rotation of the insertion part. However, stops on the retaining collar itself are also possible, which limit the rotation in that one or more of the retaining projections of the insertion ring are arranged there when the locked position is achieved.

In the locked position, a precise opposite position of the annular openings of receptacle and insertion part is guaranteed, with the result that in particular optics devices attached to the receptacle or the insertion part are in a quite precise position in relation to each other. The precise opposite alignment of insertion part and receptacle also allows an electric power connection to be looped in from the receptacle to the insertion part because the upper side of the insertion part facing the base ring has at least one electric contact element and the lower side of the base ring oriented towards the upper side of the insertion part has one suitable counter-contact element per contact element, in order to produce an electric power connection between insertion part and receptacle. Naturally, several contact element pairs can also be used. If the insertion part and/or receptacle are electrically conductive, the contact elements are, naturally, insulated in these conductive parts.

The counter-contact elements are usually designed spring-loaded, e.g. as contact pins which protrude in spring-loaded manner, e.g. by a few tenths of a millimetre, from the base ring of the receptacle. The tip of the counter-contact elements is preferably designed spherical. They retreat a little under vertical pressure and generate a counter pressure which guarantees the permanent electrical contact to the contact elements of the insertion part after locking of the insertion part in the receptacle. In order to be able to introduce the insertion part with low wear with regard to the counter-contact elements, the retaining projections have not only the retaining surfaces provided on the lower side of the insertion part for locking to the inner slanting face of the receptacle, but also, on the opposite upper side, slanting faces which are suitably designed for the counter-contact elements to slide on them. These slanting faces are found on the retaining projections at least where the counter-contact elements pass through in the insertion rotation position.

When the insertion part is inserted laterally, the spring-loaded counter-contact elements are gradually lifted by sliding on the slanting faces, with the result that they are pushed back.

It is thus avoided that, when the insertion part is being inserted, the counter-contact elements encounter a perpendicular or sharp edge which would lead to an increased wear on the counter-contact elements if the insertion part is changed several times.

The counter-contact elements are also preferably arranged such that they lie inside the contour of the insertion part at each rotation position of the insertion part from the pre-locked position into the locked position. It is thus guaranteed that, on rotation, the counter-contact elements also do not encounter a perpendicular or sharp edge which would lead to abrasion.

The planar elements designed for the three-point bearing are preferably arranged such that they do not lie in the angle range of the insertion part in which the counter-contact elements slide over the slanting face onto the upper cover surface of the insertion element. The position of the planar elements is also preferably chosen such that they lie outside or inside the radius on which the counter-contact elements are arranged, with the result that when the insertion part is rotated from the pre-locked into the locked position there can also be no collision between the counter-contact elements and the adjustment-critical planar elements.

With the advancement of the technology, an inductive transmission of the power connection is also possible.

In the case of an electrically conductive upper side of the insertion part, it is further advantageous to provide this upper side outside of the contact element(s) with an insulated cover in order to avoid a contacting of the counter-contact element during the rotation from the pre-locked position into the locked position.

Such an insulating cover can be formed in particular as a printed circuit board which connects the contact elements to each other or to corresponding bushings or connections.

The contact elements realized in the described development make possible in particular an automatic component recognition if the component fixed or to be fixed to the insertion part can be recognized via electrical signals by the constituent to which the receptacle is attached. For one thing, the part that is fixed to the insertion part can have corresponding data storage devices. However, an automatic component recognition can be realized more simply and in particular with shorter leads if a data storage device is already provided directly in or on the insertion part. When the insertion part is attached to the component, the data storage device is accordingly filled with data which can then be read out on the receptacle side via the electrical contacts.

If the microscope components house functions (such as a positioning mechanism, heating and cooling elements, illumination, etc.) which are to be controlled, a processor is preferably integrated in the component to control the functions, and this then also acts as a data storage device and undertakes the automatic component recognition.

The insertion part is suitable in particular for the attachment of objectives. For this, it is expedient to provide the insertion part with an adapter cylinder inside its annular area. For this, the objective is provided with a corresponding cylinder, preferably this adaptation is designed as a transition adaptation in order to guarantee a play-free joining of the objective (or a component) in the insertion part. The insertion part can then be attached to the objective in a rotation position that can be chosen freely. Alternatively, the insertion part can be completed in its annular area with an internal thread which is suitably moulded to an objective external thread, with the result that an objective can be screwed in. This makes it possible to use existing objectives with the device.

For the precise alignment of optical constituents, it is further preferable to provide three or more radially running bores on the insertion ring for the axial centring of a microscope component to be attached to the insertion ring.

It is understood that the features mentioned above and those yet to be explained below can be used, not only in the stated combinations, but also in other combinations or alone, without departing from the scope of the present invention.

BRIEF DESCRIPTION OF THE DRAWINGS

The invention is explained in further detail below by way of example with reference to the attached drawings which also disclose features essential to the invention. There are shown in.

DETAILED DESCRIPTION

Figure 1:
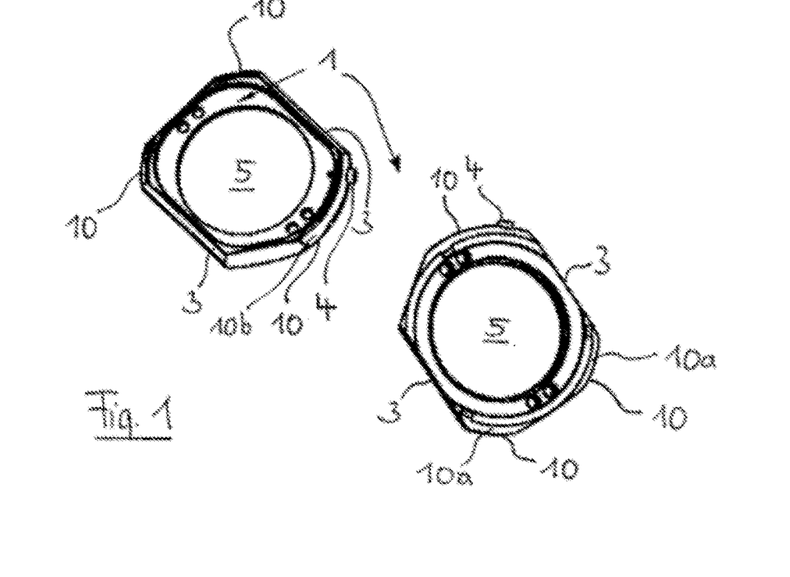
FIG. 1 two perspective representations of an insertion part of a device for attaching a microscope component, FIG. 2 two perspective representations of a receptacle to which the insertion part of FIG. 1 can be attached, FIG. 3 a top view of the insertion part of FIG. 1 during the insertion into the receptacle of FIG. 2, FIGS. 4 and 5 respectively a top view and a perspective view of the insertion part fully inserted into the receptacle, whereby the device is in a pre-locking position, FIG. 6 a sectional representation along the line B-B in FIGS. 4 and 5, FIGS. 7 and 8 respectively a top view and a perspective view of the device, after the insertion part and receptacle have been reciprocally rotated into a locking position, FIG. 9 a perspective representation of a microscope objective with insertion part attached therein, FIG. 10 a sectional representation through the microscope objective of FIG. 9, FIG. 11 a partial sectional representation of a further microscope objective with a variant of the insertion ring which makes possible an electrical contacting, and FIG. 12 a perspective representation of the insertion ring of FIG. 11, FIG. 13 a sectional representation through the insertion part of FIG. 1 during the insertion into the receptacle of FIG. 2 to illustrate a sliding procedure for spring-loaded countercontact elements, FIG. 14 a top view of the insertion part and the receptacle in the state of FIG. 13, FIG. 15 a representation similar to FIG. 13, wherein however the insertion procedure is already further advanced, and FIG. 16 a top view of the insertion part and the receptacle of FIG. 15.
Figure 2:
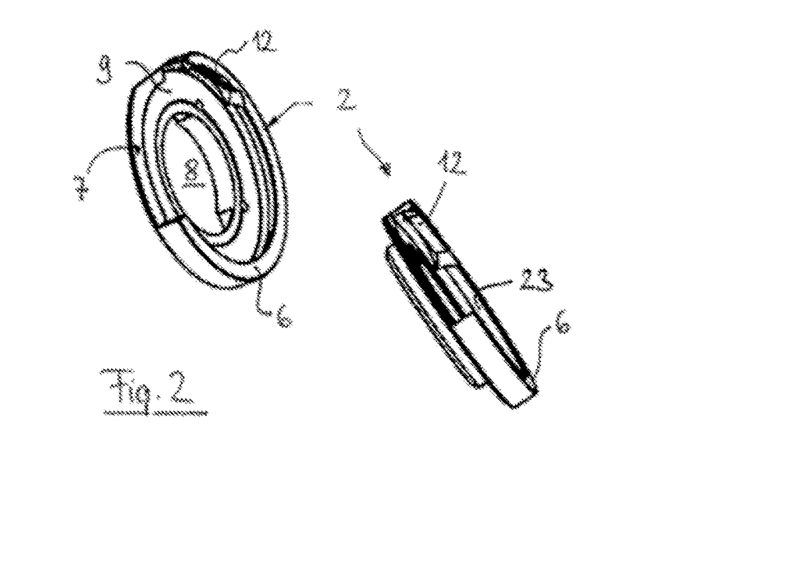

FIG. 1 shows, in perspective, an insertion part 1 which, together with the receptacle 2 shown in FIG. 2, represents a lock, i.e. a device for connecting two parts. The lock is suitable in particular for the field of microscopy, by securely fixing the receptacle 2 to the stand or a microscope component of a microscope and attaching the insertion part 1 to a microscope component, in particular an optical microscope component such as an objective. The left-hand image in FIG. 1 shows the insertion part 1 from its lower side, which faces the microscope component, and the right-hand image shows it from the upper side, which is oriented towards the receptacle. The terms "upper side" and "lower side" relate to the installation position in a microscope with suspended objective and are to be understood in this respect purely by way of example.

The insertion part 1 is annular, like the receptacle 2. Both parts are preferably made from metal. The annular shape of the insertion part 1 has two lateral flats 3 which serve to push the insertion part 1, as will be explained later, through an opening on the receptacle 2. On the edge of the annular insertion part 1, several, e.g. three, retaining projections 10 each running along a bend sector are formed which have retaining surfaces 10b which run, slanting, to the upper side of the insertion part 1. They act as retaining projections when insertion part 1 and receptacle 2 are assembled because of the flats 3, as well as further flats not indicated more precisely. In addition, slanting faces 10a which undertake a function in connection with an electrical contacting between insertion part 1 and receptacle 2 when the insertion part 1 is being inserted are optionally also provided on the opposite side of the retaining projections 10. A peg 4 provided e.g. in the area of a retaining projection 10 serves to limit rotation, as will be explained later. The annular insertion part 1 leaves open a ring inside 5 which is available for example as a cross-sectional area for an optical beam path.

The receptacle 2 shown in two different perspective representations in FIG. 2 has a base ring 9 on the lower side of which a retaining collar 6 extends downwards. The base ring 9 also runs around a ring inside 8 which, analogously to the ring inside 5, defines the free cross-section for a beam path. The retaining collar runs downwards from the base ring 9 with a tapering internal cone surface 23 the cone angle of which, i.e. slant, is designed to match the external cone which is formed by the retaining surfaces 10b of the retaining projections 10.

The retaining collar 6 is discontinuous in the area of a lateral opening 7. The size of this opening 7 corresponds to the width of the insertion part 1 between the flats 3.

Finally, on the receptacle 2 another tensioning element 12 is provided which comprises a slanting face which is pressed by a tensioning device, e.g. a spring, (not represented further in FIG. 2) away from the retaining collar 6 in the direction onto the ring inside 8. In the assembled state, it urges the retaining surfaces 10b onto the inner slanting face of the retaining collar 6 and thus ultimately the insertion part 1 onto the lower side of the base ring 9.

Figure 3:
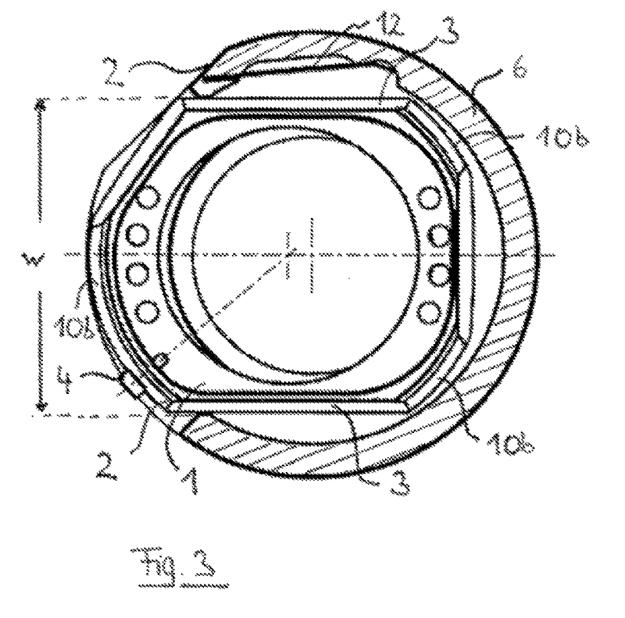

FIG. 3 shows the procedure for attaching the insertion part 1 to the receptacle 2 in a top view. To make it easier to recognize, the corresponding surface in the retaining collar 6 is hatched, as would be usual in and of itself in a pure sectional representation.

For the attachment, the insertion part 1 is inserted through the opening 7 into the receptacle 2. This is thus possible as the distance w between the flats 3 is chosen to match the size of the opening 7. FIG. 3 shows a state in which the insertion part 1 is not yet fully inserted into the receptacle. For this, the centre points of the ring insides 5 and 8 are shown in the figure, which have not yet been brought fully under cover.

In this position, the insertion part 1 can still be removed from the receptacle 2 in the optical axis direction. Should this be avoided (because e.g. a heavy component is to be fixed to the microscope or there is no space for an axial introduction of the component), the insertion part 1 can be designed such that the flats 3 are dimensioned such that the distance between the surfaces 3 is greater than the distance w in the receptacle 2. The insertion part 1 is thereby inserted into the retaining collar 6. This even additionally prevents a slipping of the component in the optical axis direction when the component is introduced into the receptacle 2.

When the insertion part 1 is pushed further into the receptacle, the retaining surfaces 10b of two of the three retaining projections 10 engage with the retaining collar 6. This state is shown in top view in FIG. 4, in perspective representation in FIG. 5 as well as in FIG. 6 in a sectional representation along the line B-B of FIGS. 4 and 5. Naturally, only the slanting faces 10b are visible due to the perspective view. In particular, it can be clearly recognized from the sectional representation that the externally conical slanting faces 10b are pressed against the internal cone 23 of the retaining collar 6, whereby the upper side of the insertion part 1 facing the base ring 9 is pressed against the corresponding lower side of the base ring 9.

Figure 4:
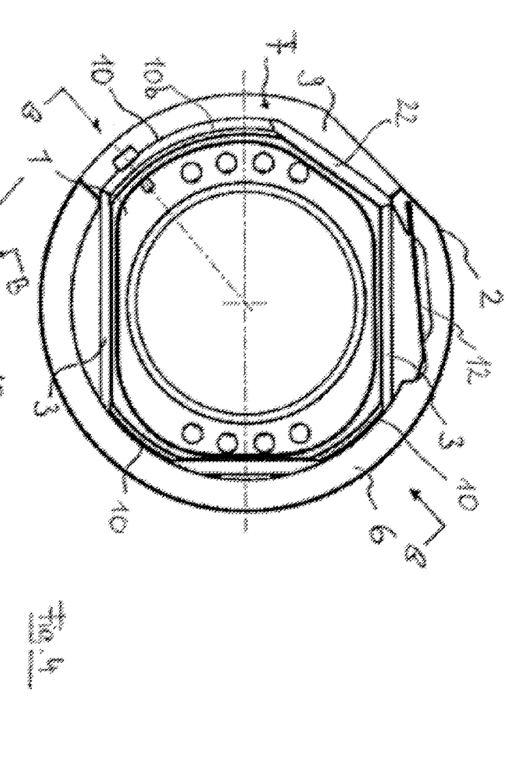
Figure 5:
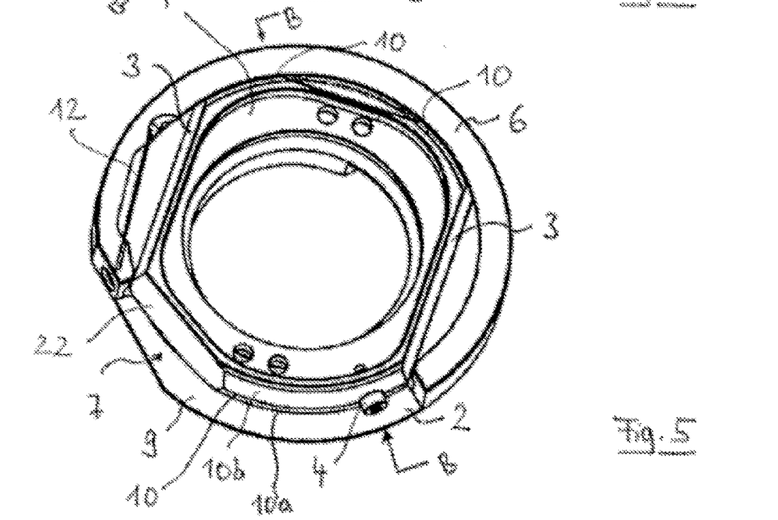
Figure 6:
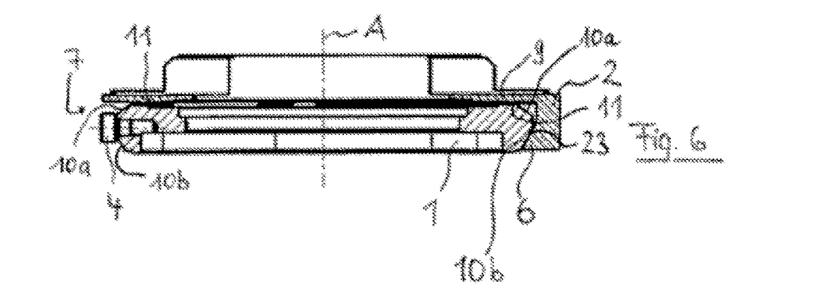

FIGS. 4 to 6 show a pre-locked position in which the ring insides 5 and 8 are brought under cover, with the result that their centres lie substantially on an axis A which is relevant e.g. as optical axis for the use of the attachment device on a microscope.

In the sectional representation of FIG. 6, two bearing surfaces 11 are drawn in by way of example, which protrude slightly on the lower side of the insertion part 1. In total, these are preferably three bearing surfaces which guarantee a three-point bearing of the upper side of the insertion part 1 against the upper side of the base ring 9.

Insertion part 1 and receptacle 2 are then reciprocally rotated. The state achieved after this can be seen in FIGS. 7 and 8. The rotation is carried out until the peg 4 is seated against the edge of the opening 7. During this rotation, the two retaining surfaces 10b already seated against the internal cone 23 of the retaining collar 6 in the pre-locked state are shifted along the retaining collar until the third retaining surface 10b also engages with the internal cone 23 of the retaining collar 6. In order to be able to produce this engagement without trouble, a sliding surface 22 is expediently provided which is arranged upstream in the direction of the rotation of the retaining surface 10b which still needs to engage with the retaining collar 6.

Figure 7:
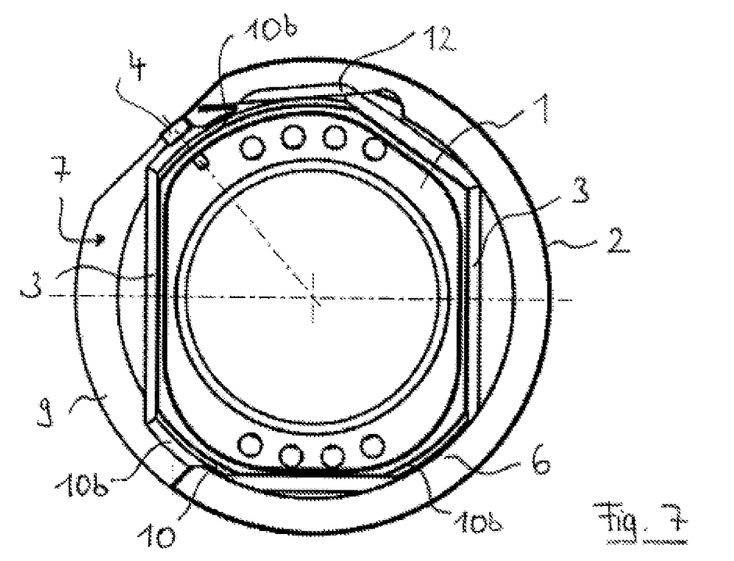
Figure 8:
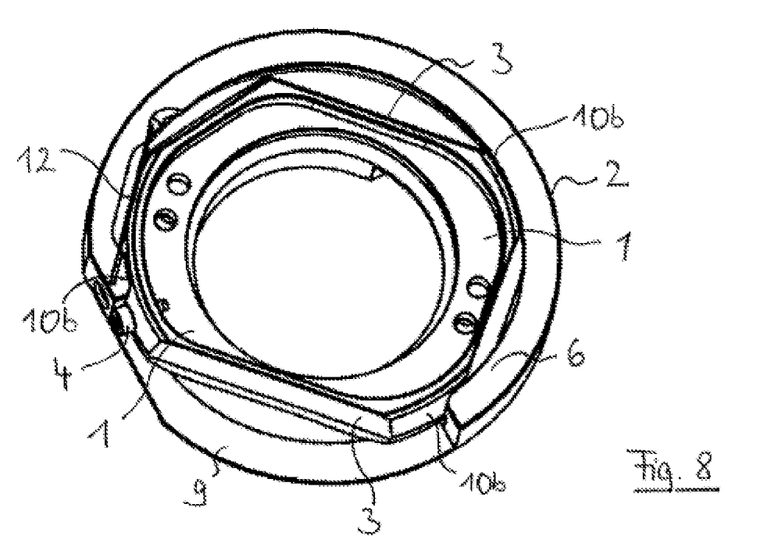

By rotating 90°, the third retaining surface 10b also engages with the internal cone 23 of the retaining collar 6, whereby a good arrangement of the bearing surfaces 11 on the base ring 9 is guaranteed.

In order to additionally press the bearing surfaces 11 against the upper side of the base ring 9, the tensioning element 12 is provided in the area of the retaining collar 6. Its slanting face presses against the third retaining surface 10b lying in this area in the locking position, whereby the insertion part 1 is pressed against the internal cone 23 of the retaining collar 6, and thus as a whole onto the base ring 9, on the retaining surfaces 10b opposite in relation to the optical axis or the ring centre. A V-shaped mounting forms, and the insertion part 1 is centred in the receptacle 2.

Figure 9:
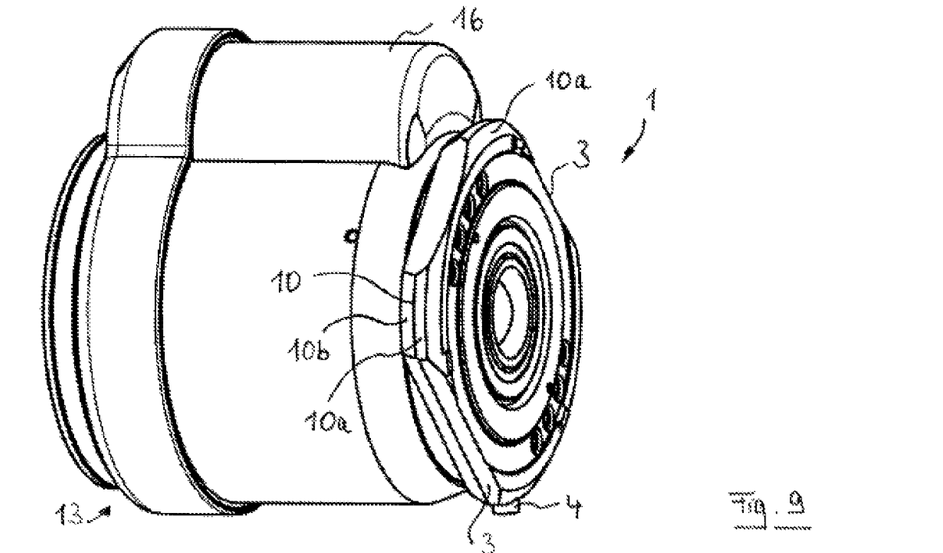
Figure 10:
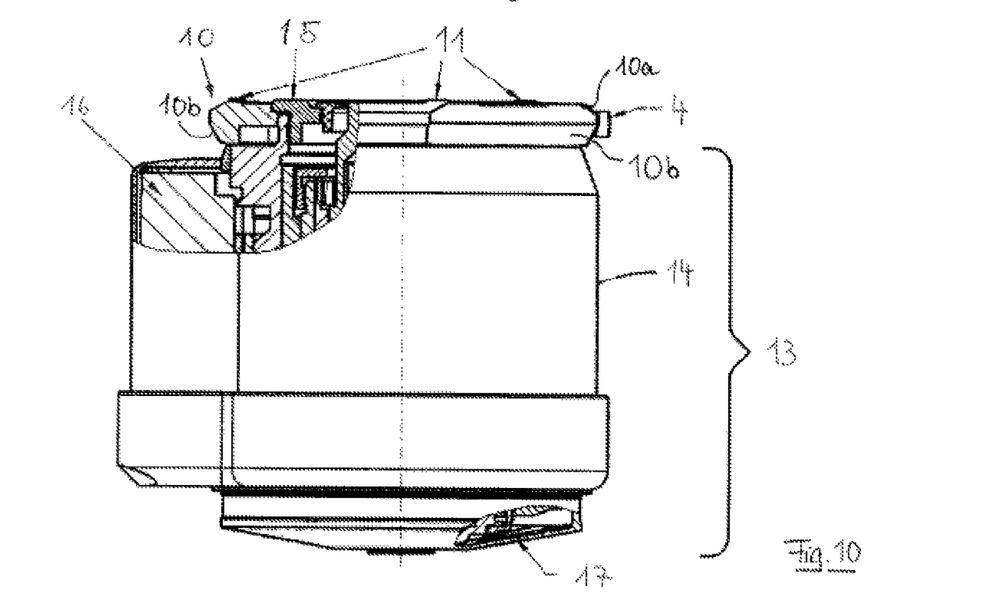

FIG. 9 shows, by way of example, how a microscope objective 13 can be attached to the insertion part 1. For this, the insertion part 1 has, in its ring inside 5, an adapter cylinder into which an adapter cylinder of the objective 13 projects. In this attachment, an exact angular position between objective 13 and insertion part 1 can be guaranteed by rotating the insertion part 1 and the objective 13. As the sectional representation of FIG. 10 shows, a lock ring 15 preferably ensures the fixed retention of the insertion part 1 on the objective 13. Alternatively adhesion or the like would also be possible.

As a rotation by only 90° need be carried out (other rotation angles are possible) during the attachment of the microscope to the insertion part 1 fixed to it in the receptacle 2, for a drive 16 provided on the microscope 13 which is attached laterally to the microscope body only a smaller space needs to be made available than if the objective 13 had to be rotated completely about its own axis. A corresponding larger turning circle would then need be provided.

The exact angular position with which the microscope can be attached by the insertion part 1 to the receptacle 2 is advantageous in particular if, as is represented in the partial sectional representation of FIG. 10, the microscope comprises an extra-axially running beam path, e.g. a TIRF beam path, over which a lateral illumination of the specimen is to be carried out.

Figure 11:
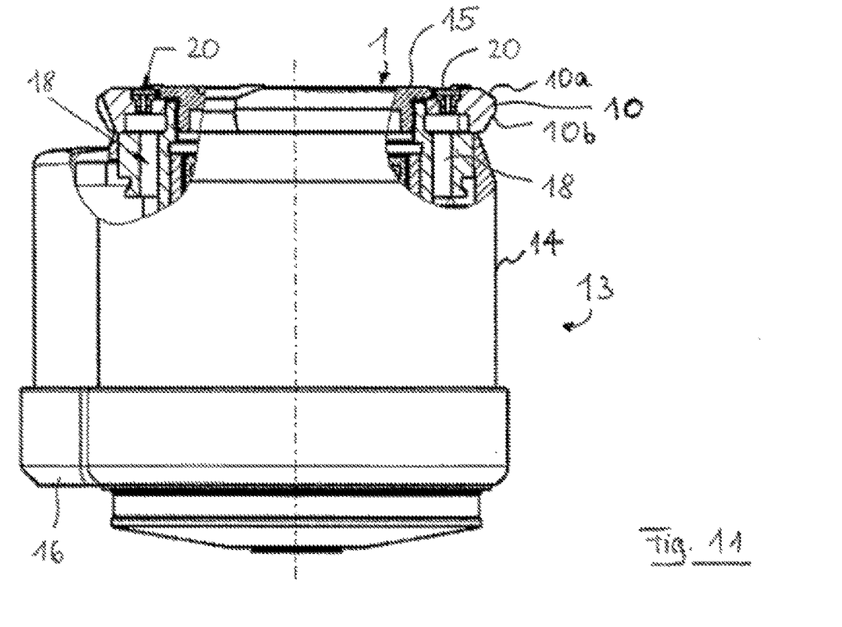

FIG. 11 shows a modification of the microscope objective 13 of FIGS. 9 and 10 again in partial sectional representation, i.e. with partially cut-open cover 14. For this objective 13, the insertion part 1 is designed such that on its side allocated to the base ring 9 it has contact elements 20 which are connected to leads running in the microscope objective 13, these are placed in the lead channel 18.

In this case, the receptacle 2 has suitable counter-contact elements 21 which come into contact with the contact elements 20 in the locking position. Via these contact elements 20, electrical data or power lines can be connected to the objective 13, for example to power and control the drive 16. It is also possible to inductively transmit data and electricity supply.

Figure 12:
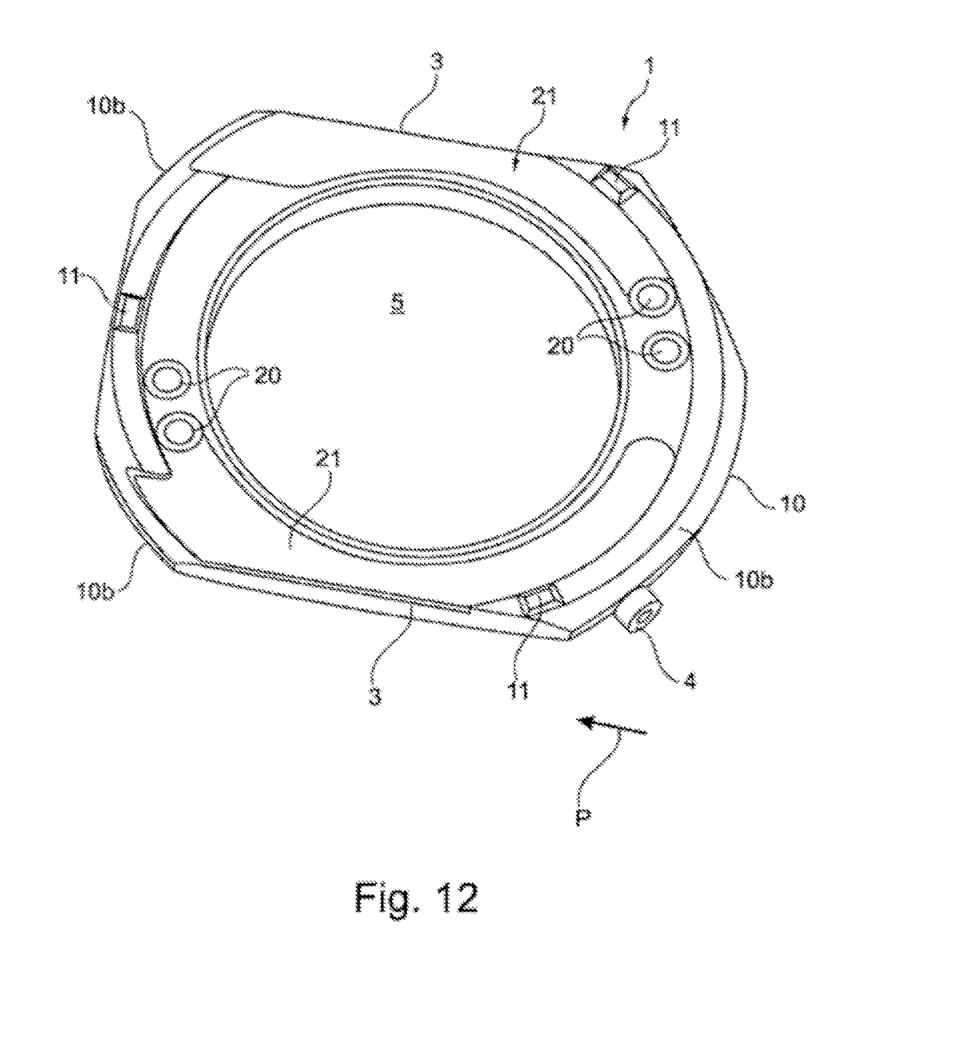

FIG. 12 shows a perspective top view of the insertion part 1 with a total of four contact elements 20. An arrow P also indicates the direction in which the insertion part 1 is inserted into the receptacle 2.

The contact elements 20 are contacted by counter-contact elements 21, as FIGS. 13 to 16 show. These counter-contact elements 21 are formed spring-loaded, for example as contact pins with a spherical tip 22. The spring-loaded counter-contact elements 21 project a little on the base ring 9. This can well be seen from sectional representations 13 and 15, which show the insertion part 1 during the insertion into the receptacle 2 at different insertion depths. This spring-loading and the slight projection of the counter-contact elements 21 are necessary in order to ensure that the spring-loaded counter-contact elements 21 produce a secure electrical contact to the contact elements 20 of the insertion part 1.

Figure 13:
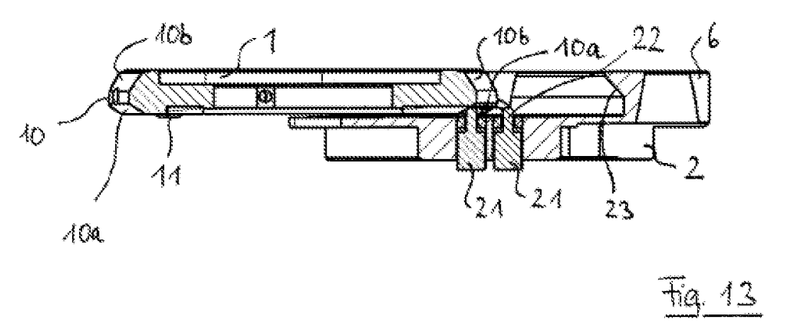
Figure 15:
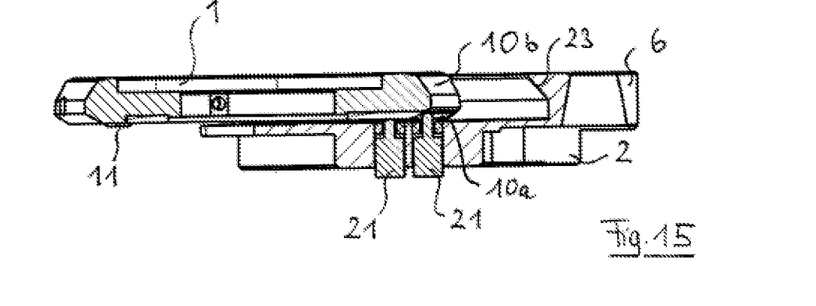
Figure 16:
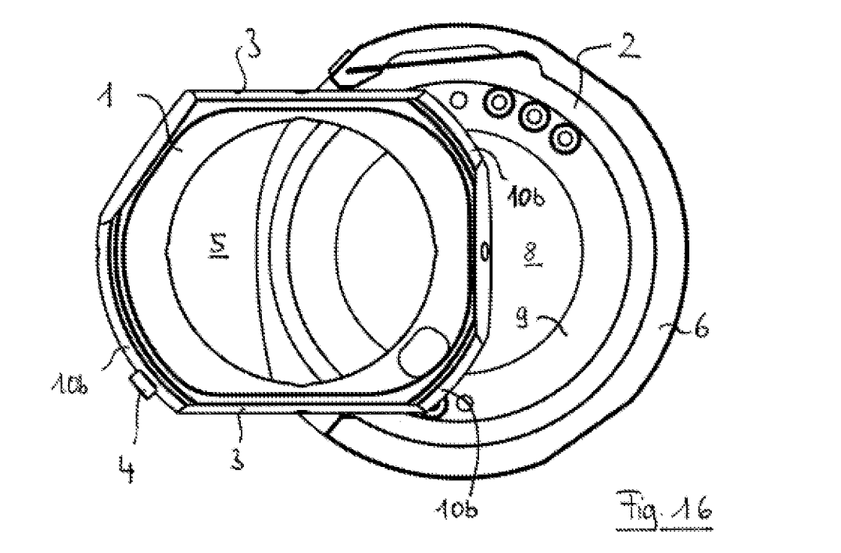

In order that the spring-loaded counter-contact elements 21 can be pressed back with low wear during the insertion of the insertion part 1, at least the retaining projections 10 that are pushed over the counter-contact elements 21 have, on the lower side, the already mentioned slanting faces 10a which are formed as sliding surfaces for the spring-loaded counter-contact elements 21. The slanting faces 10a thus extend away from the lower side of the insertion part 1 at least as far as the spring-loaded counter-contact elements 21 project from the base ring 9. It is thus ensured that, during the insertion of the insertion part 1, the spring-loaded counter-contact elements 21 do not come up against a perpendicular edge of the insertion part 1, but can be pressed back over the sliding surface.

Figure 14:
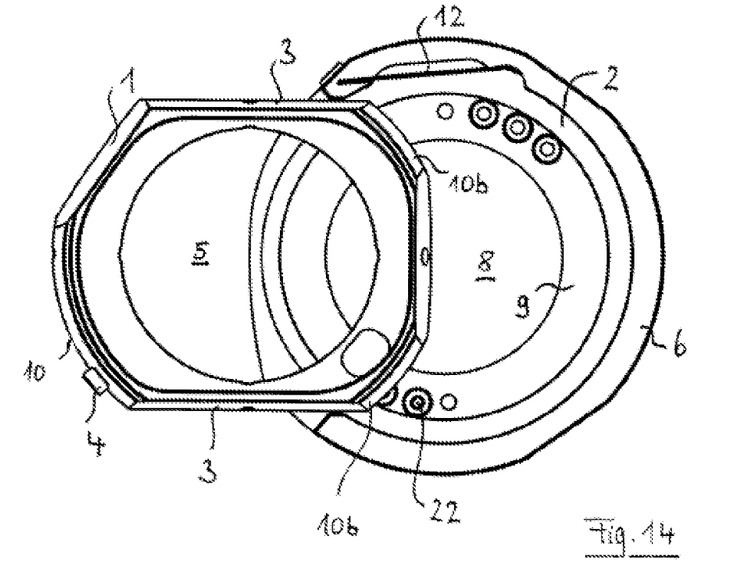

FIGS. 13 to 16 show different stages in the insertion of the insertion part 1 into the receptacle 2, wherein FIGS. 13 and 14 show a state in which a first spring-loaded counter-contact element 21 slides on the slanting face 10a. FIG. 13 shows a sectional representation, FIG. 14 the corresponding top view. The insertion procedure has already progressed further in FIGS. 15 and 16, and a second spring-loaded counter-contact element 21 slides on the sliding surface.

The sliding surface in the form of the slanting face or slanting faces 10a is provided at least everywhere on the retaining projections 10 where the insertion part 1 passes over spring-loaded counter-contact elements 21 during the insertion procedure.

In order that, when receptacle 2 and insertion part 1 are reciprocally rotated, the counter-contact elements 21 move with low wear from the pre-locked position, i.e. from the state of the fully inserted insertion part 1, into the final locked position via the contact elements 20 of the insertion part 1, they are spaced relative to the centre of this rotational movement, which can be seen for example in FIG. 4 or corresponds to the optical axis A in FIG. 6, such that they remain fully inside the contour of the insertion part 1 during the rotation procedure. This means that, during all phases of the reciprocal rotation, the spring-loaded counter-contact elements 21 remain fully beneath the insertion part 1. The spring-loaded counter-contact elements 21 are thus prevented from encountering a perpendicular step on the insertion part 1 during the rotation procedure.

The insertion part 1, as already explained for example with reference to FIGS. 6 and 10, has planar faces 11 which are designed for a three-point bearing of the insertion part 1 on the receptacle 2. These planar faces 11 are adjustment-critical elements, as they ensure the reciprocal alignment of insertion part 1 and receptacle 2. They therefore project slightly on the upper side of the insertion part 1.

In order to now avoid a collision between the spring-loaded counter-contact elements 21 and the planar faces 11, the planar faces 11 lie on the insertion part 1 relative to the later rotation centre outside an angle range through which the spring-loaded counter-contact elements 21 run during insertion of the insertion part 1. Depending on the angle of rotation which occurs during the rotation into the locking position, the planar elements 11 could in addition pass over the positions of the spring-loaded counter-contact elements 21 during this rotation procedure. In order to avoid this, it is additionally provided in such embodiments that the planar elements 11 lie relative to the centre on a radius which differs from the radius of the counter-contact elements 21. The planar elements 11 thus lie inside or outside the radius or the radii on which the at least one or the several counter-contact elements 21 are arranged.

In order that, during the rotation from the pre-locked position into the locked position, the counter-contact elements 21 are not contacted or bridged in an undesired way via the metallic material of the insertion part 1, an insulating layer 21 is provided on the upper side of the insertion part 1. This layer 21 ensures that the counter-contact elements 21 of the receptacle are not short-circuited until the insertion part 1 is located in the final locked position. Expediently, the layer 21 can also be formed as a printed circuit board which connects the contact elements 20 or provides a through connection to the opposite side of the insertion part 1 and thus to the objective 13.

In so far as embodiments have been described above in which the insertion part 1 is attached to a microscope objective, this is, naturally, not the only possible application. Rather, other components, in particular optical components, such as condensers, lens tubes, lamp housing, etc., can also be attached with the described attachment device. The described attachment device can be used in particular on the connection between lens tube and stand. It allows an integrated camera in the lens tube, an integrated display in the lens tube, the reflection of additional information in the lens tube which can be visible in the eyepiece and on a camera interface at the same time, the drive of motor-movable lens tubes and in particular a motor-driven switching between different microscope operating modes. The attachment device can also be used on the connection between lamp housing and stand, between stage carrier and object stage, in particular a motor-driven object stage, between condenser and condenser support and via all components that are connected to the microscope by a screw thread. For the latter, the insertion part is provided only with the connection thread with planar arrangement relative to the component. Thus, any existing objective can be provided with the insertion part 1.

The insertion part 1 can be aligned and fixed on the optical component, for example a microscope, for example via a nut adapter, wherein an optical system is provided which allows adjustment, in particular allows the rotation position of the component attached to the insertion part 1 to be evaluated. This naturally also applies analogously to the attachment of the receptacle 2. In this case, a corresponding test adapter can be attached to an insertion ring 1. If the corresponding positioning of the receptacle 2 or of the insertion part 1 is achieved, a gap-filling fixing is provided, for example via adhesives, soldered joints, etc. This procedure has the advantage that the insertion part or the receptacle need not be formed directly on the respective constituent by a machining operation, although this is, naturally, also possible. However, the gap-filling attachment further has the advantage that the attachment point for the receptacle 2 or the insertion ring 1 can be provided with tolerances which are then absorbed by the gap-filling attachment, for example the adhesive gap.

A conventional assembly of the receptacle 2 on the microscope or in a microscope component with the attachment via screws is also possible. For this, the centring can be achieved by shifting the receptacle 2 in the microscope or the microscope component.

The attachment device according to the invention allows a plurality of advantages in connection with microscopy:

- The motorized drive of an objective is simplified, as the motor drive can be arranged laterally on the objective casing. It is further possible to transmit control and power signals to the objective in a simple way. Thus, a control device provided in any case in the microscope can also for example undertake the control of the objective or accordingly control the drive. The control of the drive is possible in particular in the case of piezo drives and also lends itself to autofocusing applications. More than just one adjusting member can also be moved independently of each other through radial distribution of the drives on the objective. An integrated processor then controls the individual drives.
- The electrical contactability is also advantageous for a temperature-controlled objective, such as described for example in DE 102005001102.0 A1, the disclosure content of which is included here to its full extent in this regard. Here too, the control can now be carried out by a control unit of the microscope. The monitoring of the heating via temperature sensors in the microscope is now also possible without trouble, as the corresponding elements are simply fixed.
- A dark-field illumination without a separate dark-field channel is possible. In this way, bright-field objectives can be retrofitted with a dark-field illumination. This also applies analogously to a TIRF illumination in the objective.
- The use of a Hoffmann contrast becomes easier to realize, as the alignment of the Hoffmann aperture is dispensed with.
- The easy electrical connectability moreover allows variable phase, Varel or Hoffmann contrast methods using a liquid crystal shutter which can replace a solid phase shutter in the objective.
- Polarization contrasts are improved, as the optics, in particular the objective, are aligned in a defined rotation position.
- Additional current feeds are no longer required for microhardness testers.
- As already mentioned, an automatic component recognition is simplified. This is also the case in particular when a corresponding memory element is already provided directly in the insertion part 1.
- A differential interference contrast now becomes possible with a prism already correctly aligned in the objective.
- If a motor-driven mirror is provided in the objective, a simple rotating microscope can be realized by defined rotation and synchronized image acquisition.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device for attaching a first optical microscope part to a second part and permitting transmission of at least one of data and electricity supply, the device comprising:
    an annular receptacle attached to the second part;
    a corresponding annular insertion part comprising a lower side, wherein the insertion part is attachable to the first part oriented such that the lower side of the insertion part faces away from the receptacle and wherein the annular insertion part comprises retaining projections, the retaining projections including outwardly sloping retaining surfaces on the lower side of the insertion part,
    wherein the receptacle includes a base ring with a retaining collar, the retaining collar having an inner slanting face tapering away from the base ring and in which a lateral opening is formed, through which the insertion part can be inserted into the receptacle such that it is in a pre-locked position in which the annular openings overlap, and
    wherein the insertion part and the receptacle are movable by reciprocal rotation from the pre-locked position into a locked position in which the retaining surfaces of the retaining projections of the insertion part are seated against the inner slanting face of the retaining collar to press the insertion part onto the base ring, whereby the insertion part is locked to the receptacle, and
    wherein the insertion part further includes an upper side facing the base ring, the upper side including at least one electrical contact element, and wherein a lower side of the base ring is oriented towards the upper side of the insertion part having one suitable counter-contact element per contact element, which is configured to produce an electric power connection between the insertion part and the receptacle.

2. The device according to claim 1, wherein the counter-contact element is spring-loaded, projects on the upper side of the insertion part and is pretensioned in the direction of the receptacle, and wherein the retaining projections on the upper side opposite the lower side comprise at least one outwardly sloping slanting face which is formed as a sliding surface for the counter-contact element.

3. The device according to claim 2, wherein the upper side of the insertion part is electrically conductive and the upper side of the insertion part is provided with an insulating cover outside the contact element, in order to prevent contacting of the counter-contact element during the rotation.

4. The device according to claim 3, wherein the insulating cover is formed as a printed circuit board and connects to the contact element.

5. The device according to claim 1, wherein the counter-contact element is spring-loaded, projects on the upper side of the insertion part and is pretensioned in the direction of the receptacle and lies at a distance from a center about which the insertion part and the receptacle are reciprocally rotated and which is dimensioned such that the counter-contact element remains completely inside the contour of the insertion part during reciprocal rotation.

6. The device according to claim 5, wherein the planar elements lie either outside or inside a radius on which the at least one contact element is arranged.

7. The device according to claim 5, wherein the planar elements lie outside an angle range in which the counter-contact element slides into the pre-locked position over the slanting face and the upper side of the insertion part during insertion.

8. The device according to claim 1, wherein at least one of the insertion part and the receptacle includes a stop to limit reciprocal rotation during rotation into the locked position.

9. A device for attaching a first optical microscope part to a second part and permitting transmission of at least one of data and electricity supply, the device comprising:
    an annular receptacle attached to the second part;
    a corresponding annular insertion part comprising a lower side, wherein the insertion part is attachable to the first part oriented such that the lower side of the insertion part faces away from the receptacle and wherein the annular insertion part comprises retaining projections, the retaining projections including outwardly sloping retaining surfaces on the lower side of the insertion part,
    wherein the receptacle includes a base ring with a retaining collar, the retaining collar having an inner slanting face tapering away from the base ring and in which a lateral opening is formed, through which the insertion part can be inserted into the receptacle such that it is in a pre-locked position in which the annular openings overlap,
    wherein the insertion part and the receptacle are movable by reciprocal rotation from the pre-locked position into a locked position in which the retaining surfaces of the retaining projections of the insertion part are seated against the inner slanting face of the retaining collar to press the insertion part onto the base ring, whereby the insertion part is locked to the receptacle, and
    wherein the upper side of the insertion part facing the base ring includes planar elements forming a three-point bearing.

10. A device for attaching a first optical microscope part to a second part and permitting transmission of at least one of data and electricity supply, the device comprising:
    an annular receptacle attached to the second part;
    a corresponding annular insertion part comprising a lower side, wherein the insertion part is attachable to the first part oriented such that the lower side of the insertion part faces away from the receptacle and wherein the annular insertion part comprises retaining projections, the retaining projections including outwardly sloping retaining surfaces on the lower side of the insertion part,
    wherein the receptacle includes a base ring with a retaining collar, the retaining collar having an inner slanting face tapering away from the base ring and in which a lateral opening is formed, through which the insertion part can be inserted into the receptacle such that it is in a pre-locked position in which the annular openings overlap,
    wherein the insertion part and the receptacle are movable by reciprocal rotation from the pre-locked position into a locked position in which the retaining surfaces of the retaining projections of the insertion part are seated against the inner slanting face of the retaining collar to press the insertion part onto the base ring, whereby the insertion part is locked to the receptacle, and
    wherein a data storage device is provided in the insertion part for automatic component recognition.

11. The device according to claim 1, wherein the insertion part includes an internal thread configured to screw in an objective or has an annular opening (5) formed as an adapter cylinder which is matched to an adapter cylinder of the objective (13).

12. The device according to claim 1, wherein the insertion part includes an annular opening formed as an adapter cylinder which is matched to an adapter cylinder of an objective.

13. The device according to claim 1, wherein the insertion part includes three or more radially running bores configured to axially center a microscope component to be attached to the insertion ring.

14. The device according to claim 1, wherein the retaining collar includes a spring-loaded section which presses the insertion part onto the base ring.

\* \* \* \* \*